(12) United States Patent
Broman et al.

(10) Patent No.: US 10,914,617 B1
(45) Date of Patent: Feb. 9, 2021

(54) FLEXIBLE SENSOR MOUNT FOR HARD SHELL BLOOD RESERVOIR

(71) Applicant: TERUMO CARDIOVASCULAR SYSTEMS CORPORATION, Ann Arbor, MI (US)

(72) Inventors: William Broman, Grosse Pointe Woods, MI (US); Kevin R. Line, Ann Arbor, MI (US)

(73) Assignee: Terumo Cardiovascular Systems Corporation, Ann Arbor, MI (US)

( * ) Notice: Subject to any disclaimer, the term of this patent is extended or adjusted under 35 U.S.C. 154(b) by 0 days.

(21) Appl. No.: 16/524,588

(22) Filed: Jul. 29, 2019

(51) Int. Cl.
*G01D 11/30* (2006.01)
*G01D 11/24* (2006.01)
*G01F 23/296* (2006.01)

(52) U.S. Cl.
CPC ............ *G01D 11/30* (2013.01); *G01D 11/24* (2013.01); *G01F 23/2961* (2013.01)

(58) Field of Classification Search
CPC ...... G01D 11/18; G01D 11/245; G01D 11/26; G01D 11/30; G01D 11/305; G01N 29/223; A61B 5/6833; A61B 5/14532; G01G 15/185; G01G 15/18; G01G 23/22–2968; A61M 1/3624; A61M 1/3636
See application file for complete search history.

(56) References Cited

U.S. PATENT DOCUMENTS

| | | | |
|---|---|---|---|
| 3,894,205 A * | 7/1975 | List | H01R 33/46 200/51.07 |
| 4,019,373 A | 4/1977 | Freeman et al. | |
| 4,274,418 A * | 6/1981 | Vesterager | A61B 5/04082 204/403.06 |
| 4,440,022 A * | 4/1984 | Masom | G01F 23/2922 250/577 |
| 4,598,733 A * | 7/1986 | Kanno | A61M 1/3624 128/DIG. 13 |
| 4,778,446 A * | 10/1988 | Jensen | A61M 1/0088 604/27 |
| 4,840,337 A * | 6/1989 | Zaugg | B62J 6/02 248/115 |
| 4,984,462 A | 1/1991 | Hass, Jr. et al. | |
| 5,043,707 A * | 8/1991 | Heinze | A61M 1/3624 128/DIG. 13 |
| 5,065,892 A | 11/1991 | Lukez | |
| 5,275,367 A | 1/1994 | Frye | |

(Continued)

*Primary Examiner* — Tran M. Tran
(74) *Attorney, Agent, or Firm* — Darryl Newell; MacMillan, Sobanski & Todd, LLC

(57) ABSTRACT

A mounting device holds a sensor, such as an ultrasonic fluid level sensor, against a side of a reservoir, such as a blood reservoir in an extracorporeal blood circulation system. Flexible foot pads in a base sheet carry an adhesive coating for attaching the footpads to an arbitrarily shaped outer wall of the reservoir. A rigid bayonet-type locking connector which receives the sensor is suspended from the base sheet by a tubular coupling member which preferably includes a resilient section that flexes to maintain the sensor in an orthogonal relationship with the reservoir wall. The resilient section preferably includes helical arms which are under tension when the sensor is locked into place in order to create a desirable amount of preload force between the sensor and the wall.

12 Claims, 10 Drawing Sheets

(56) References Cited

U.S. PATENT DOCUMENTS

| | | | |
|---|---|---|---|
| 5,438,868 A * | 8/1995 | Holden | G01F 23/296 |
| | | | 342/124 |
| 5,644,093 A | 7/1997 | Wright et al. | |
| 5,767,775 A | 6/1998 | Shukla et al. | |
| 5,823,045 A * | 10/1998 | Van Driel | G01F 17/00 |
| | | | 73/299 |
| 5,859,366 A * | 1/1999 | Van Driel | A61M 1/3624 |
| | | | 73/149 |
| 5,955,672 A * | 9/1999 | Van Driel | A61M 1/024 |
| | | | 73/149 |
| 6,412,344 B1 | 7/2002 | Danicich et al. | |
| 6,631,639 B1 * | 10/2003 | Dam | G01F 23/2961 |
| | | | 340/621 |
| 7,100,462 B2 * | 9/2006 | Gronvall | G01D 11/245 |
| | | | 73/866.5 |
| 7,429,249 B1 * | 9/2008 | Winder | A61N 7/00 |
| | | | 424/9.52 |
| 7,621,877 B2 * | 11/2009 | Schnall | A61B 5/6843 |
| | | | 600/507 |
| 7,628,764 B2 * | 12/2009 | Duarte | A61N 7/00 |
| | | | 601/2 |
| 7,646,544 B2 * | 1/2010 | Batchko | G02B 3/14 |
| | | | 359/665 |
| 7,694,570 B1 * | 4/2010 | Dam | G01F 1/662 |
| | | | 310/328 |
| 7,706,985 B2 * | 4/2010 | Fogarty | G01M 5/0016 |
| | | | 702/33 |
| 7,900,346 B2 * | 3/2011 | Fogarty | G01D 11/245 |
| | | | 248/73 |
| 8,185,327 B2 * | 5/2012 | Fogarty | G01M 5/0016 |
| | | | 702/33 |
| 8,190,229 B2 * | 5/2012 | Lowery | A61B 5/6833 |
| | | | 600/323 |
| 8,500,673 B2 * | 8/2013 | Zanotti | A61M 1/3666 |
| | | | 604/6.15 |
| 8,506,513 B2 * | 8/2013 | Rossi | A61J 1/18 |
| | | | 604/6.15 |
| 8,518,000 B2 * | 8/2013 | Gray | A61B 5/1427 |
| | | | 604/272 |
| 9,003,910 B2 * | 4/2015 | Fukuda | G01D 11/02 |
| | | | 74/409 |
| 9,159,017 B2 | 10/2015 | Poplawski | G06K 19/0776 |
| 9,983,043 B2 * | 5/2018 | Castaneda | G01N 29/223 |
| 10,119,940 B2 * | 11/2018 | Tat | G01N 29/04 |
| 10,188,423 B2 * | 1/2019 | Andrus | A61M 1/1008 |
| 10,335,322 B2 * | 7/2019 | Doshi | A61F 13/84 |
| 10,429,214 B2 * | 10/2019 | Staton | G01D 11/245 |
| 10,458,833 B2 * | 10/2019 | Rossi | A61M 1/024 |
| 10,548,561 B2 * | 2/2020 | Telfort | A61B 7/04 |
| 10,605,785 B2 * | 3/2020 | Iannotti | G01L 1/165 |
| 2015/0099971 A1 * | 4/2015 | Sandrin | G01N 29/032 |
| | | | 600/438 |
| 2016/0098624 A1 * | 4/2016 | Chompff | G09F 3/0295 |
| | | | 235/494 |
| 2016/0266071 A1 * | 9/2016 | Bentouhami | G01N 29/2418 |
| 2018/0073867 A1 * | 3/2018 | Abdellatif | G01N 29/07 |
| 2019/0167167 A1 * | 6/2019 | Mitchell | A61B 5/14546 |
| 2019/0216397 A1 * | 7/2019 | Yavorsky | A61M 5/14 |
| 2019/0257797 A1 * | 8/2019 | Humfeld | B29C 70/443 |

* cited by examiner

FLEXIBLE SENSOR MOUNT FOR HARD SHELL BLOOD RESERVOIR

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to a mounting device for a sensor, and, more specifically, to a device for mounting a sensor to an outside surface of a reservoir such as a blood reservoir.

It is common to mount one or more fluid level sensors on rigid blood reservoirs to trigger warnings (alerts or alarms) when the fluid level in the reservoir exceeds or drops below various levels. An "alert" is an audible and/or visible warning to the perfusionist or other medical practitioner that, for example, the liquid level in the reservoir has dropped below a specified level, with the perfusionist or other medical practitioner manually taking any desired or necessary steps in response. An "alarm" is an audible and/or visible warning plus an automatic response by the equipment, for example, stopping a perfusion pump. One preferred technique is to provide an "alert" for a first low level of liquid, and an "alarm" when the liquid drops below a second, even lower level.

Typically, rigid blood reservoirs have housing walls formed of transparent and ultrasonic-compatible material, such as polycarbonate. Frequently, the reservoirs have generally round cross sections or other non-flat wall sections. In order to accommodate sensor attachment at arbitrarily-shaped wall positions, flexible strips with an adhesive coating have been used as mounting pads to attach a sensor connector to the reservoir wall. The mounting pads are disposable after use, and the ultrasonic sensors are reusable. Known mounting pads are disclosed in U.S. Pat. No. 5,644,093, which is incorporated herein by reference in its entirety.

The level thresholds (i.e., volume of blood in the reservoir) for setting the alarm and alert limits may depend upon the size of a patient, the specific medical procedure, and other factors. The use of mounting pads allows the perfusionist or other medical practitioner to locate a corresponding sensor at any desired level. For optimum performance in circulating the blood, the reservoir walls are generally curved and may have complex shapes. In addition, the inclusion of other perfusion components and tubing may obstruct some portions of the reservoir walls, limiting the options for sensor placement. Thus, it would be desirable to achieve robust attachment and proper orthogonal orientation of the sensor regardless of the particular shaping of the wall.

One potential concern with many prior mounting pads is failure of the mounting pad to remain fixed to the reservoir wall during use. The loss of robust retention of the sensor against the reservoir wall can result in the generation of false alerts and alarms.

For proper performance, the sensor should be oriented orthogonally to the wall and should be gently pushed against the wall by a preload force. A connector socket for receiving the sensor typically comprises a rigid cylinder which is mounted perpendicular to the adhesive pads. If the attachment of the pads to the reservoir wall results in a sensor alignment that is not orthogonal, then performance may be diminished and/or the preload force may lead to separation of the mounting pad from the reservoir due to "peeling" of the adhesive area.

SUMMARY OF THE INVENTION

In one aspect of the invention, a mounting device for attaching a blood sensor to a wall of a blood reservoir comprises a base sheet with a central aperture and a plurality of radial footpads extending from an inner ring encompassing the central aperture. The footpads are flexible, and an adhesive covers at least a portion of a bottom surface of the footpads for adhering the base sheet to the reservoir wall. A rigid receiver has a tubular shape with a central bore and is configured to secure the blood sensor to interface with the reservoir wall within the central aperture. A coupling member is provided having a tubular shape with an upper ring secured to the receiver, a bottom end secured to the inner ring of the base sheet, and a resilient linking section between the upper ring and the bottom end. The coupling member suspends the rigid receiver such that the central bore is aligned with the central aperture. The resilient linking section flexes to orient the blood sensor to be orthogonal with the reservoir wall.

DETAILED DESCRIPTION OF PREFERRED EMBODIMENTS

Figure 1:
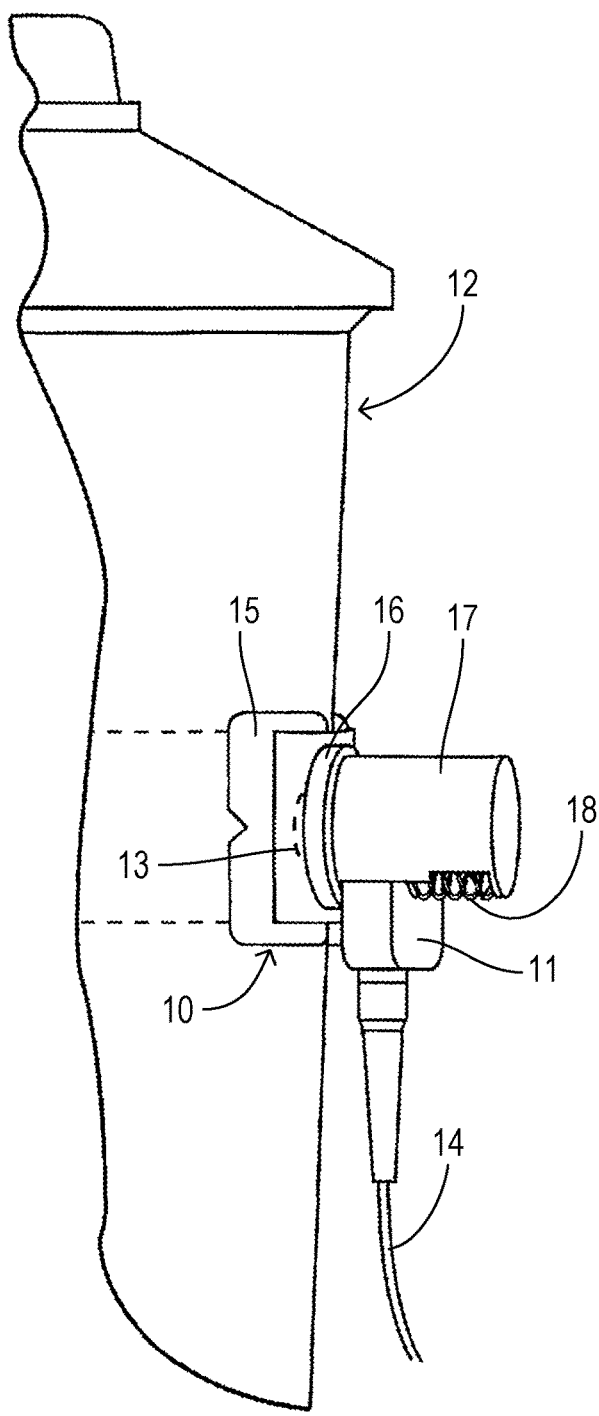
FIG. 1 is a partial perspective view of a prior art mounting pad applied to a reservoir wall.

Referring to FIG. 1, a mounting pad device 10 holds an ultrasonic transducer 11 of a level sensor in operative relationship with a reservoir 12 to, for example, detect a level of fluid, e.g., blood. Ultrasonic transducer 11 includes a transducer lens 13 that is brought into contact with an outer wall of reservoir 12, conventionally, after a gel has been provided between transducer lens 13 and the wall. A cable 14 connects ultrasonic transducer 111 with additional apparatus for generating an alert or alarm, and if an alarm is generated, stopping the perfusion pump. For example, when the liquid level drops below the level of the ultrasonic transducer 11, a visual and acoustic alarm is generated and the blood pump (not shown) of the support circuit is stopped. Mounting pad 10 may also be used to hold other types of sensors, for example, optical blood gas sensors, bubble detectors, or any other sensor that is held adjacent or against a wall.

Mounting pad 10 has adhesive sheet 15 and body 16 including a bayonet-type connector 17 to receive and attached sensor 11 to reservoir 12. A spring 18 is used to urge sensor 11 against the reservoir wall.

Figure 2:
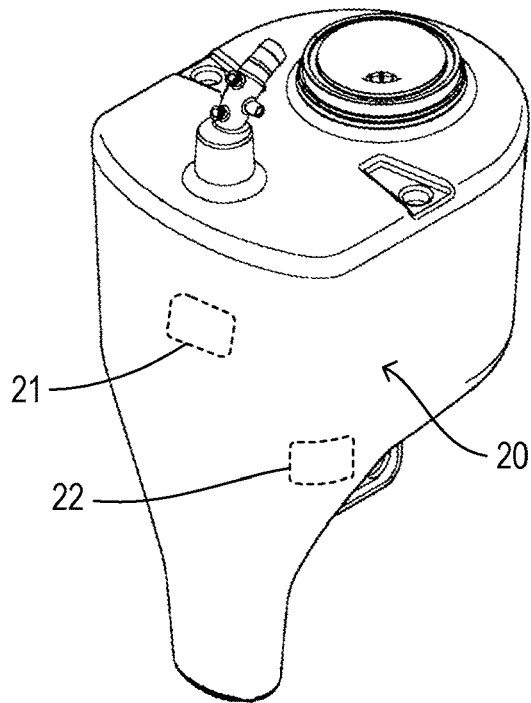
FIG. 2 is a perspective view of a prior art reservoir having a different shape.

FIG. 2 shows another conventional reservoir 20 having a compound shape such that different surface profiles are present at potential attachment sites 21 and 22. Regardless of the actual attachment site selected, a mounting device needs to reliably retain the sensor in place while maintaining an orthogonal orientation with a preload force.

FIGS. 3-10 show a first embodiment of a mounting device 30 for obtaining both reliable adhesion and proper contact between a sensor transducer and a reservoir wall. An adhesion portion is flexible in order to adhere to various reservoir geometries and a sensor locking portion is suspended for independent movement which achieves an orthogonal arrangement regardless of the specific orientation of the adhesion portion.

Figure 3:
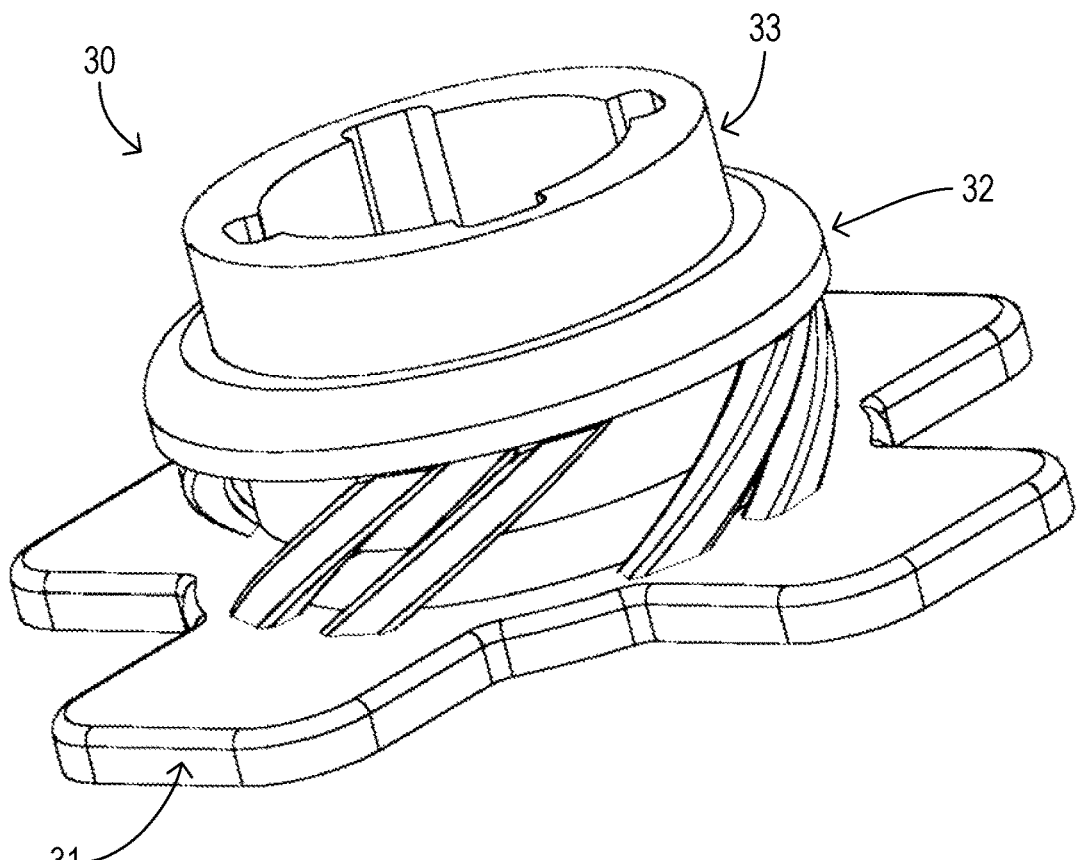
FIG. 3 is a perspective view of a mounting device according to one preferred embodiment of the invention.

In FIG. 3, mounting device 30 has a base sheet 31, a coupling member 32, and a rigid receiver 33. Receiver 33 attaches to base sheet 31 only through coupling member 32. Coupling member 32 includes a resilient material which is deformable to enable receiver 33 to slant with respect to base sheet 31 so that a sensor within receiver 33 can be made orthogonal to a reservoir wall when the orientation of a section of the wall beneath base sheet 31 differs from the orientation of the wall where the sensor makes contact.

Figure 4:
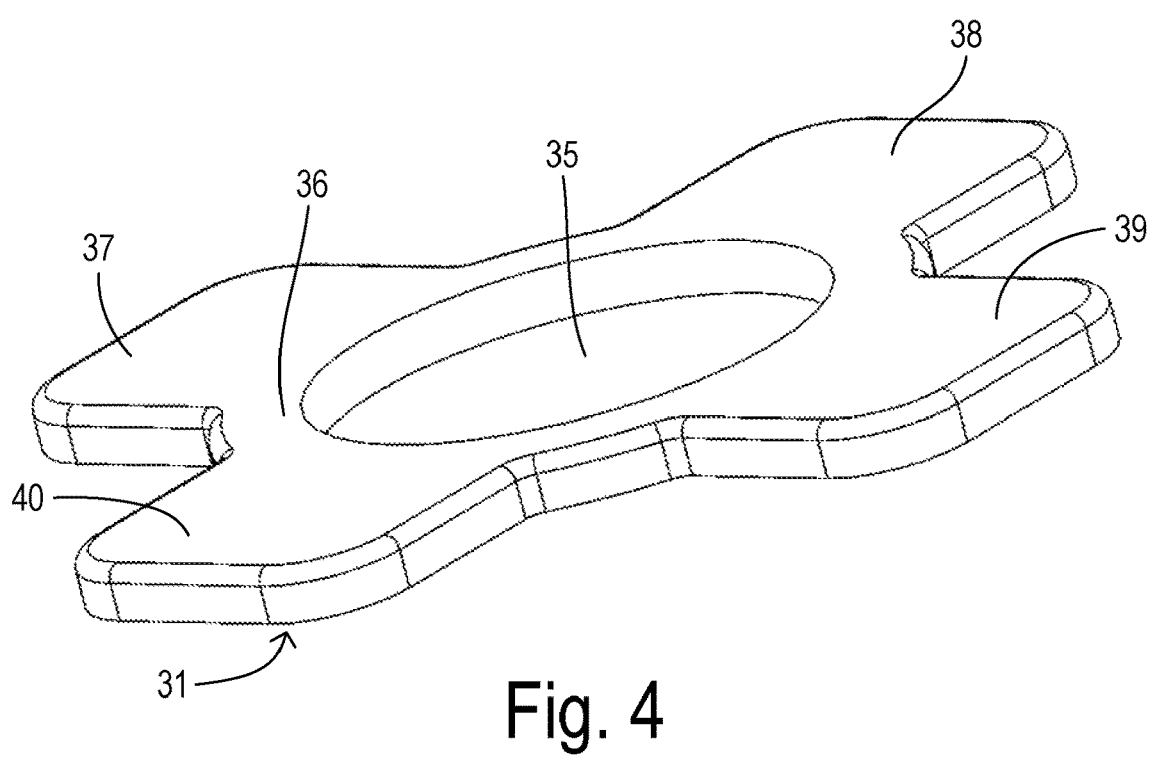
FIG. 4 is a perspective view of the base sheet of the mounting device of FIG. 3.
Figure 10:
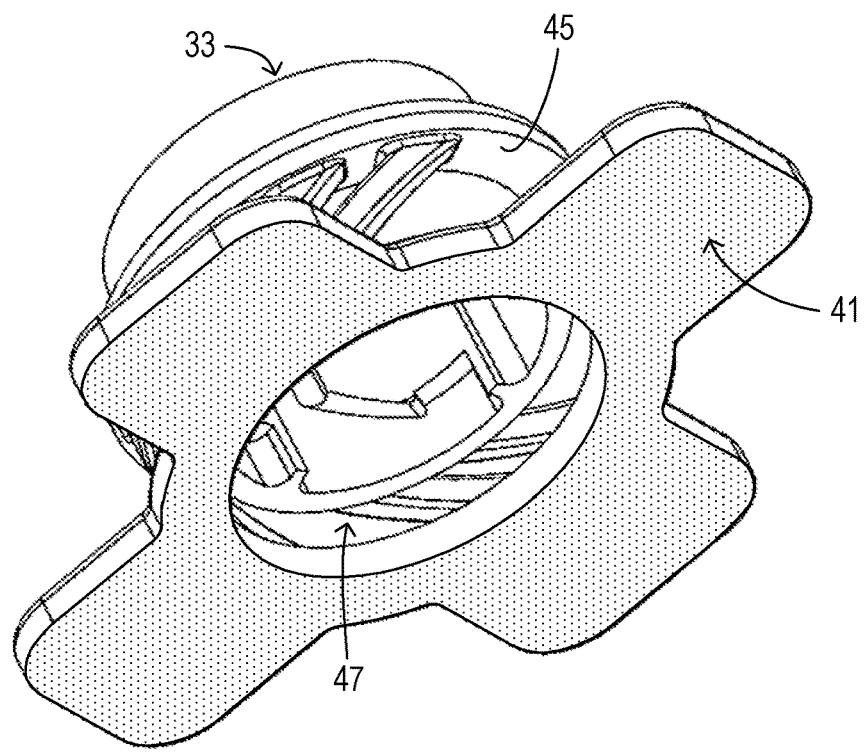
FIG. 10 is a bottom, perspective view of the mounting device of FIG. 3 showing the adhesive coating.

FIG. 4 shows base sheet 31 in greater detail. Base sheet 31 has a central aperture 35 defined by an inner ring 36 encompassing central aperture 35. A plurality of radial footpads 37-40 extend from inner ring 36. Base sheet 31 is comprised of a flexible material such as rubber, silicone, PVC or other resins. Consequently, footpads 37-40 are flexible. Preferably, base sheet 31 is optically transparent to maintain visibility of a blood level within the reservoir. As shown in FIG. 10, an adhesive 41 covers at least a portion of a bottom surface of footpads 37-40 for adhering base sheet 31 to a reservoir wall. During shipping and handling prior to use, a peelable protective film may overlie adhesive 41 which can be removed when mounting to a reservoir.

Figure 5:
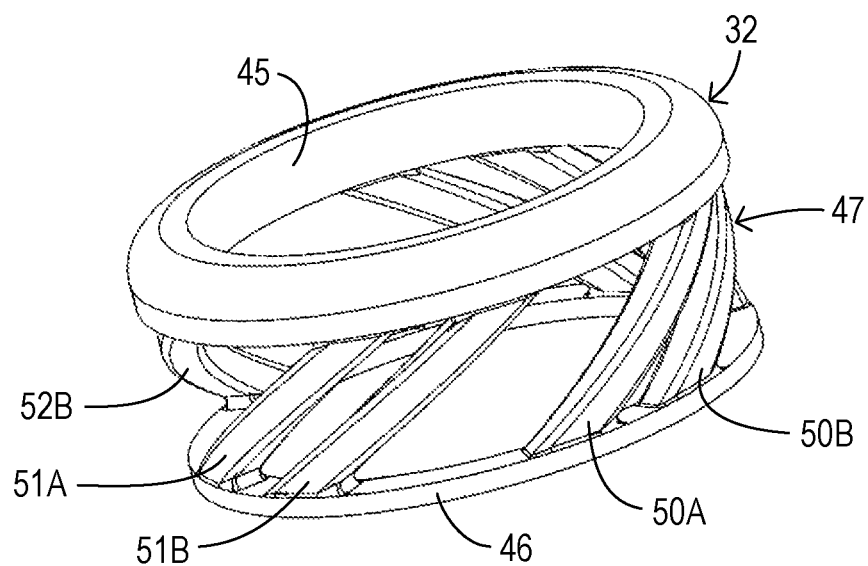
FIG. 5 is a perspective view of the coupling member of the mounting device of FIG. 3.
Figure 6:
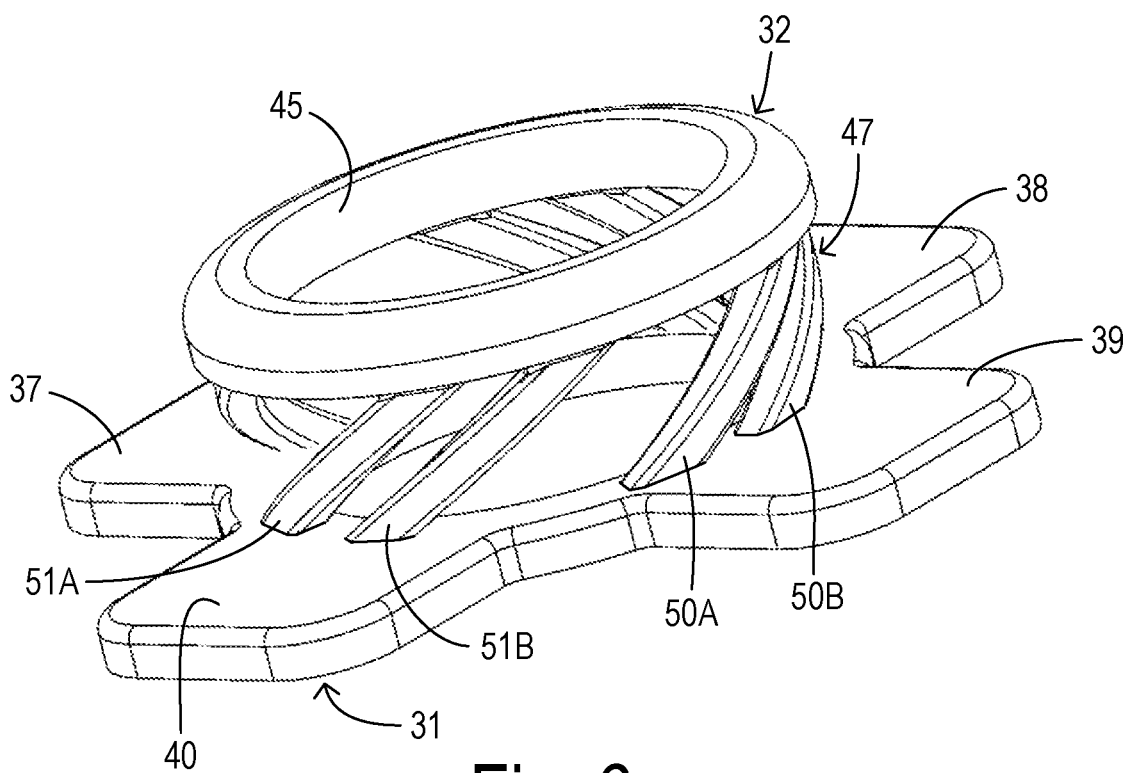
FIG. 6 is a perspective view of the base sheet integrated with the coupling member by overmolding.

FIG. 5 shows coupling member 32 in greater detail. Coupling member 32 has a tubular shape with an upper ring 45 for securing to an outer surface of receiver 33. Coupling member 32 has a bottom end 46 which is secured to inner ring 36 of base sheet 31. In this embodiment, bottom end 46 is formed as a base ring. Preferably, upper ring 45 and base ring 46 are cylindrical or toroidal in shape in order to interface with a rigid receiver 33 and base sheet aperture 35 which are also cylindrical/circular. Other tubular cross-sectional shapes could also be used depending on the shape of a sensor that is being mounted, for example.

Coupling member 32 has a resilient linking section 47 between upper ring 45 and base ring 46. Preferably, coupling member 32 is one unitary piece of material, but at least resilient linking section 47 is comprised of a molded, flexible material such as rubber, silicone, butyl, or other elastomers. The attachment of base ring 46 to inner ring 36 of base sheet 31 ensures that upper ring 45 is aligned with central aperture 35 when resilient linking section 47 is in its natural, undeformed state. In this preferred embodiment, linking section 47 takes the form of a plurality of flexible tethers or arms spaced around a perimeter of rings 45 and 46. The arms may be arranged in pairs, with each pair connecting to base sheet 31 at a corresponding footpad. Thus, a pair of arms 50A and 50B extend from footpad 39 to upper ring 45. A pair of arms 51A and 51B extend from footpad 40 to upper ring 45, and similar pairs of arms extend from footpads 37 and 38 to upper ring 45 (e.g., arm 52B). In a most preferred embodiment, the arms (including 50A, 50B, 51A, and 51B) follow a helical path (with the arms being helically parallel to one another). This relationship enhances the ability to tilt or slant in any direction while providing a consistent elastic deformation for creating a tension that translates to an appropriate preload force for the sensor against the reservoir.

Preferably, base sheet 31 is overmolded onto base ring 46 (see FIG. 6 and FIG. 8), resulting in low manufacturing cost. In addition, base ring 46 is embedded in base sheet 31 so that there is little chance of detachment.

Figure 7:
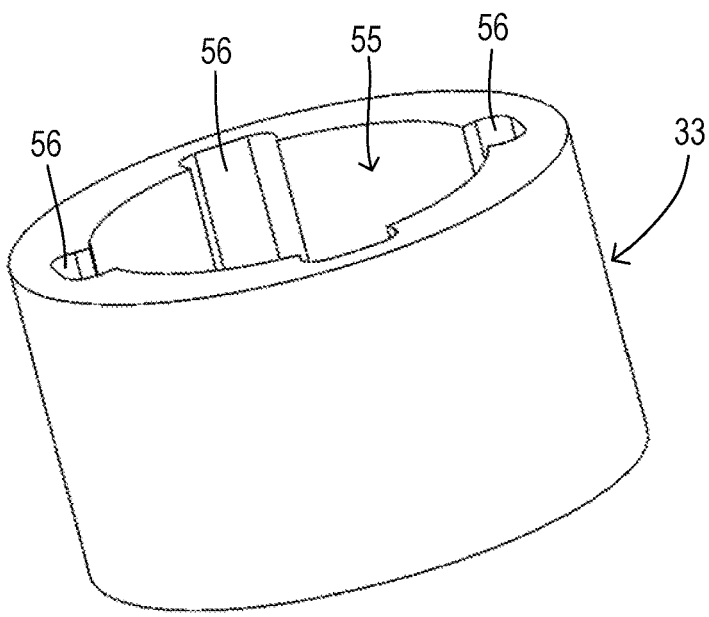
FIG. 7 is a perspective view of the rigid receiver of the mounting device of FIG. 3.
Figure 8:
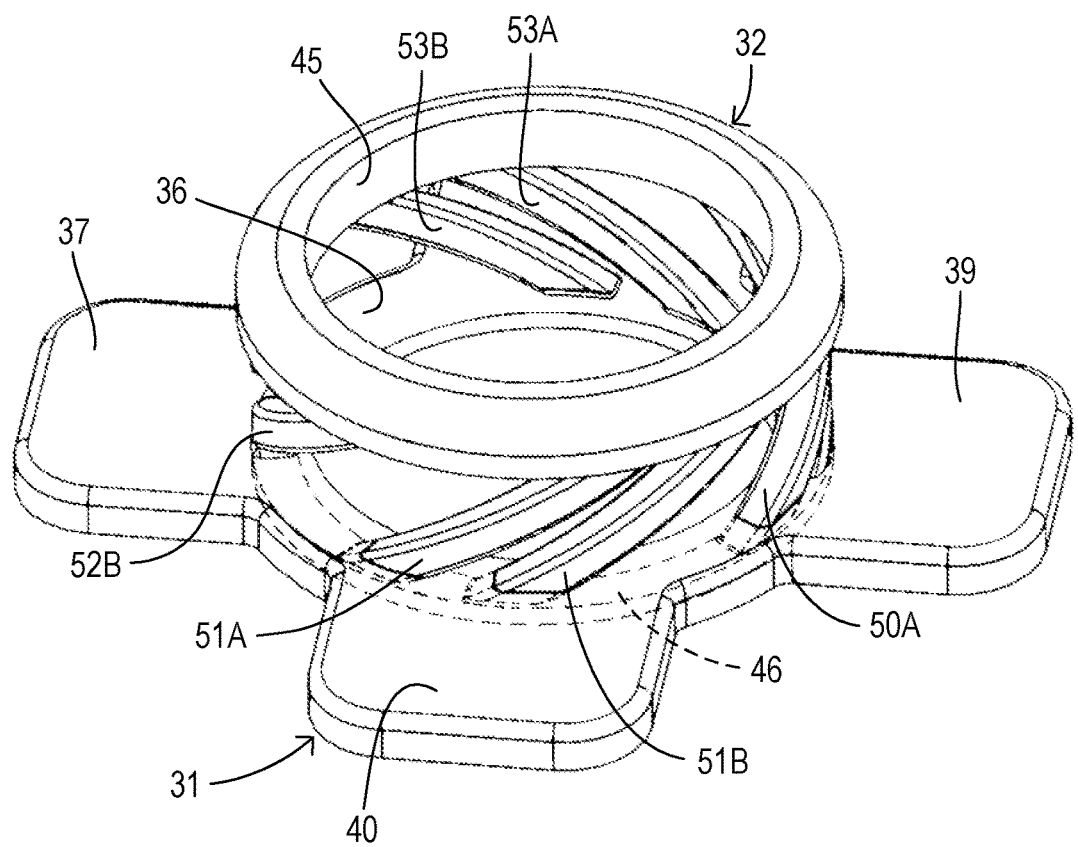
FIG. 8 is another perspective view of the mounting device of FIG. 3.
Figure 9:
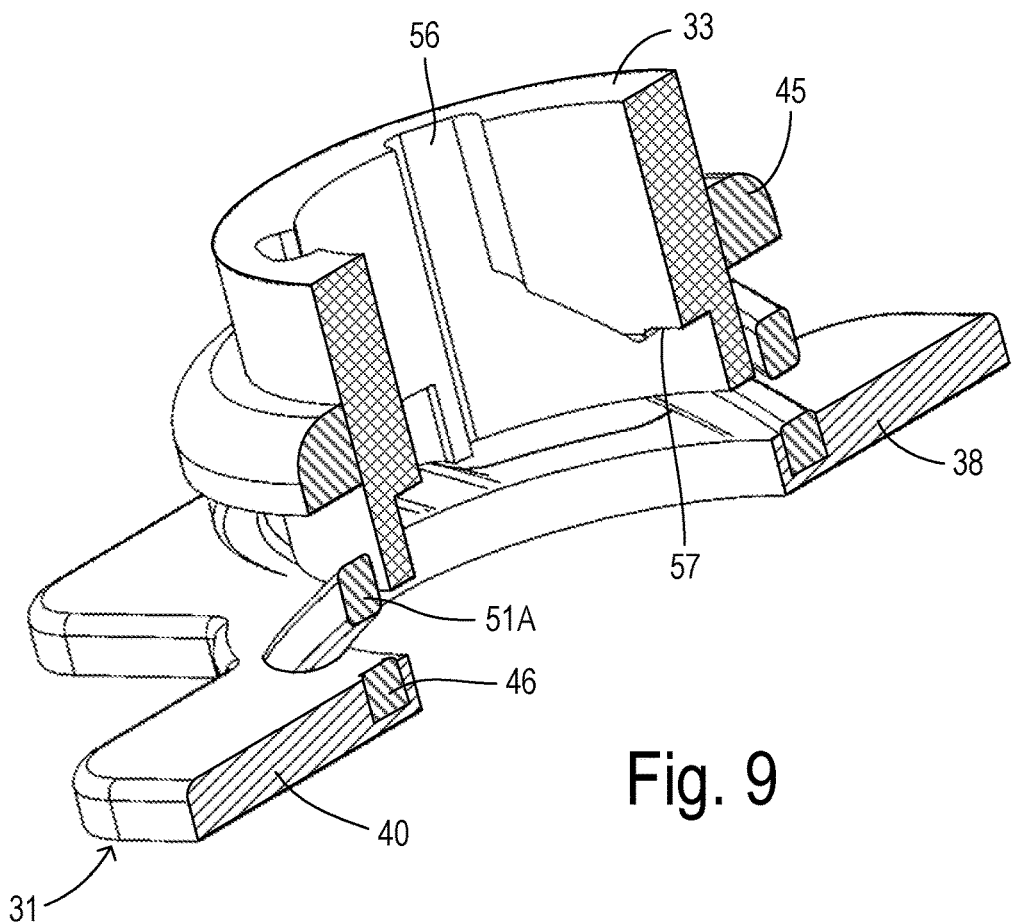
FIG. 9 is a perspective, cross-sectional view of the mounting device of FIG. 3.

FIG. 7 shows rigid receiver 33 in greater detail. Receiver 33 has a tubular shape with a central bore 55. Central bore 55 has a generally cylindrical shape to match the shape of an ultrasonic transducer, for example. Central bore 55 further includes bayonet slots 56 for receiving corresponding features on the sensor, so that the sensor can be locked into position within receiver 33. Slots 56 have capture sections 57 shown in FIG. 9 for locking the sensor in place by rotating the sensor, as known. Receiver 33 has an outside diameter matching an inside diameter of upper ring 45 so that receiver 33 can be mounted within and supported by upper ring 45 (see FIG. 3). Receiver 33 can be held using an interference fit or an adhesive can be used.

Once receiver 33 is mounted within upper ring 45, coupling member 32 suspends rigid receiver 33 such that central bore 55 is aligned with central aperture 35. After attaching footpad 37-40 to a reservoir wall and with a sensor locked into receiver 33, resilient linking section 47 flexes to orient the blood sensor to be orthogonal with the reservoir wall.

Figure 11:
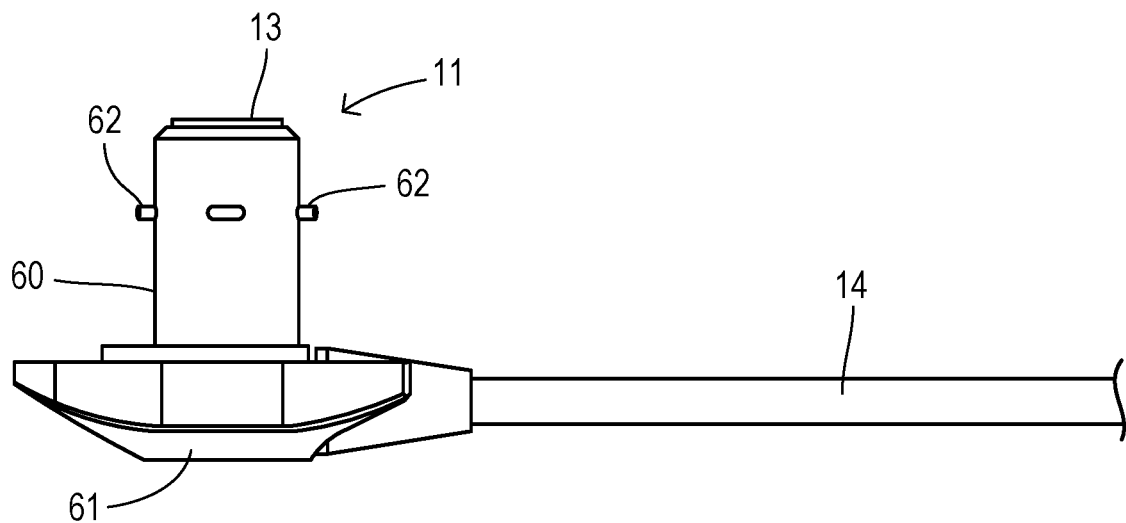
FIG. 11 is a side view of an ultrasonic sensor with a bayonet mount.
Figure 12:
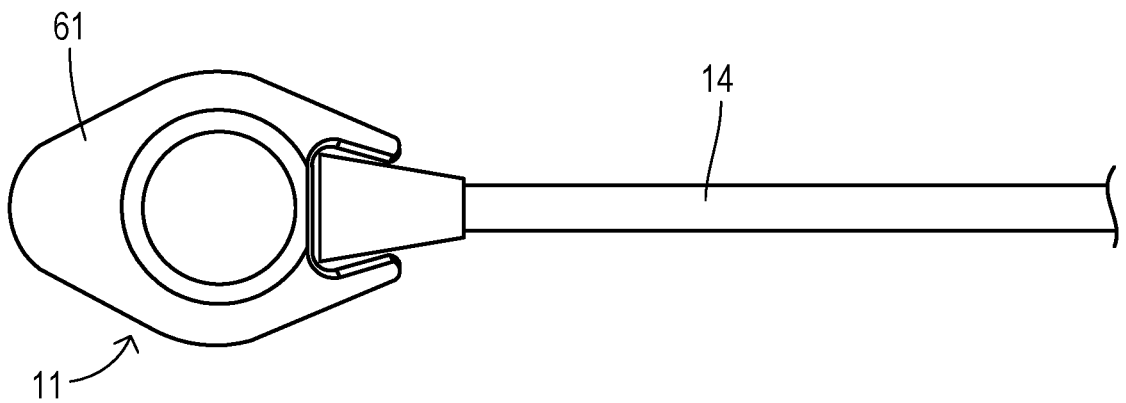
FIG. 12 is a top view of the sensor of FIG. 11.
Figure 13:
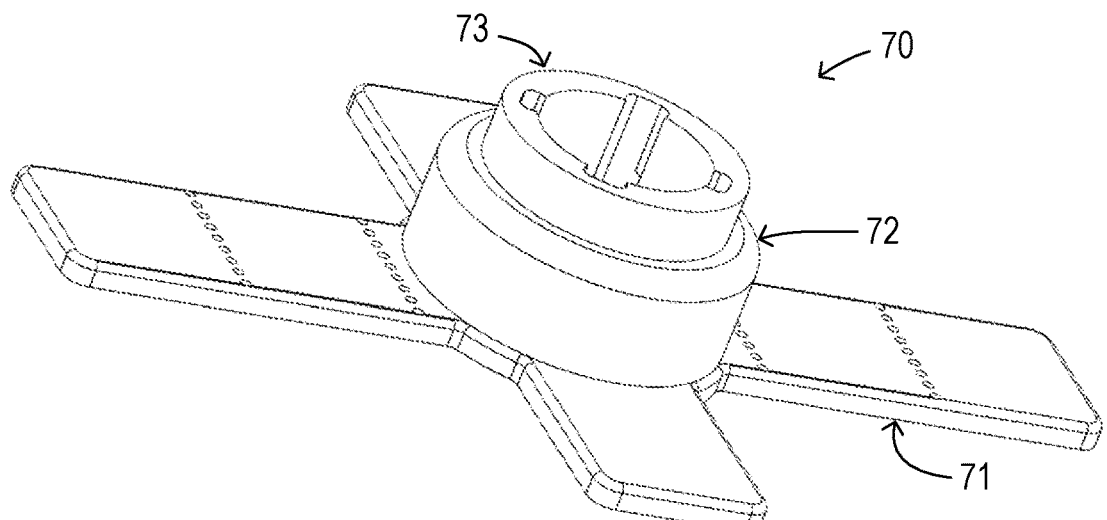
FIG. 13 is a perspective view of another preferred embodiment of a mounting device.
Figure 14:
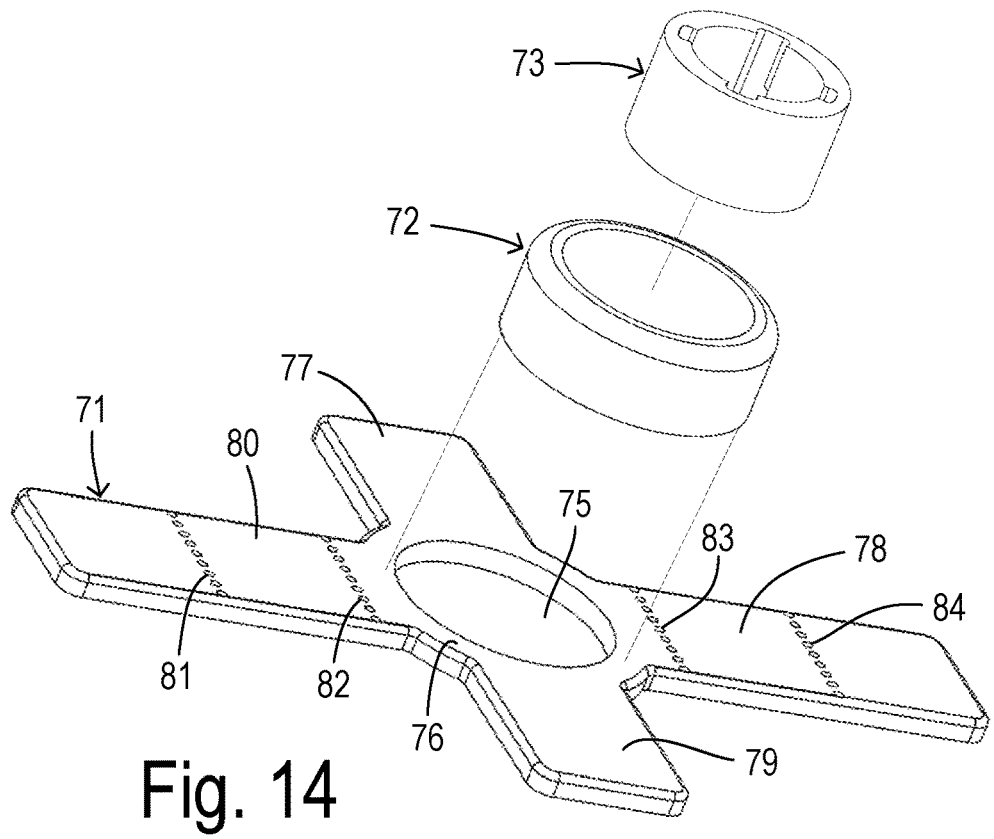
FIG. 14 is an exploded, perspective view of the mounting device of FIG. 13.
Figure 15:
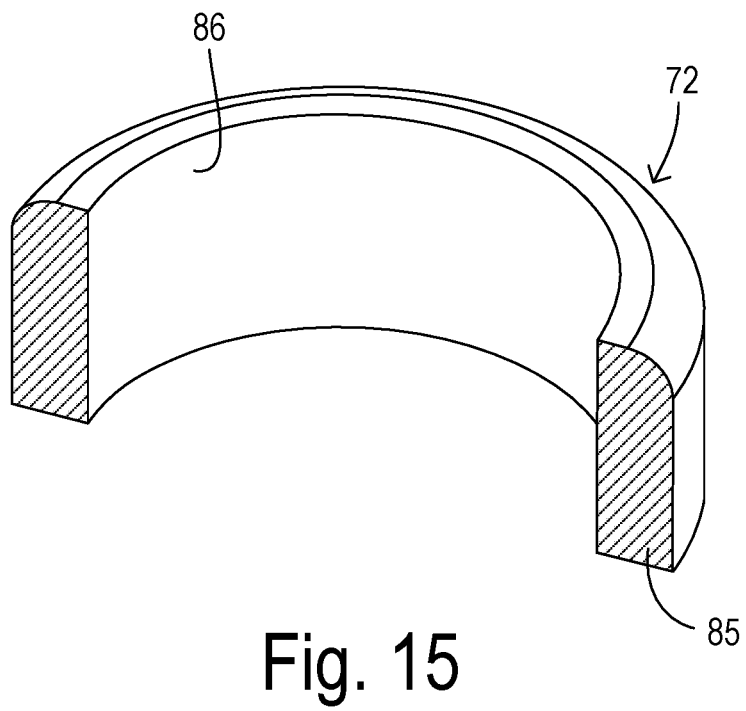
FIG. 15 is a perspective, cross-sectional view of the coupling member of the mounting device of FIG. 13.

FIGS. 11 and 12 show an ultrasonic level sensor in greater detail. A cylindrical sensor body 60 extends from a sensor head 61. Body 60 supports lens 13 and has a plurality of bayonet pins 62 extending radially and having a length adapted to interlock with slots 56 in receiver 33. Since resilient linking section 47 of the invention preloads sensor 11 after mounting with the mounting device, the spring as shown in FIG. 1 is no longer needed.

FIGS. 13-16 show another preferred embodiment of a mounting device 70 having a base sheet 71, a coupling member 72, and a rigid receiver 73. Receiver 73 attaches to base sheet 71 only through coupling member 72. Coupling member 72 has a generally cylindrical shape and is comprised of a resilient material (e.g., a molded elastomer such as rubber). Base sheet 71 is also formed of a resilient material and has a central aperture 75 defined by an inner ring 76 encompassing central aperture 75. A plurality of flexible, radial footpads 77-90 extend from inner ring 76. Base sheet 71 is preferably comprised of a clear, flexible material such as a rubber, silicone, PVC or other resins, and is coated with an adhesive on its bottom surface (not shown) for adhering base sheet 71 to a reservoir wall. In order to adapt the footpads to various shapes and regions on a reservoir wall, a plurality of perforations (e.g., depressions or through-holes) can be formed across various portions of the footpads to selectably weaken base sheet 71 so that a footpad or a portion of a footpad can be removed by tearing. For example, perforation lines 81-84 are created on footpads 78 and 80 to enable tearing of base sheet 71 to match the extent/arrangement of the footpads to a desired target area on the reservoir wall (including any curved or other non-flat surfaces. Thus, the presence/absence or length of respective footpads can be adjusted. Instead of tearing, the diameter and/or spacing of the perforations in the line of perforations can alternatively be configured in a way that reduces resistance to folding along the line.

Figure 16:
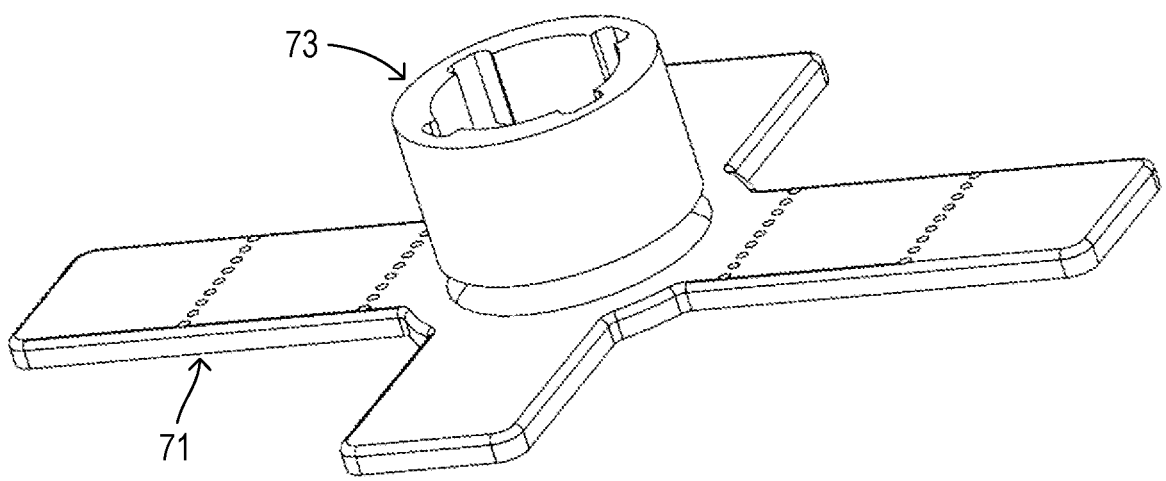
FIG. 16 is a perspective view of the base sheet and rigid receiver of the mounting device of FIG. 13.

In this embodiment, coupling member 72 is formed as a cylindrical collar which extends continuously as a ring. A bottom surface 85 of coupling member 72 is affixed to inner ring 76 of base sheet 71 (e.g., by gluing or welding). An inner surface 86 of coupling member 72 is affixed to receiver 73 (e.g., by gluing or interference fit) in a position that maintains receiver 73 is suspended over base sheet 71 as shown in FIG. 16.

Figure 17A:
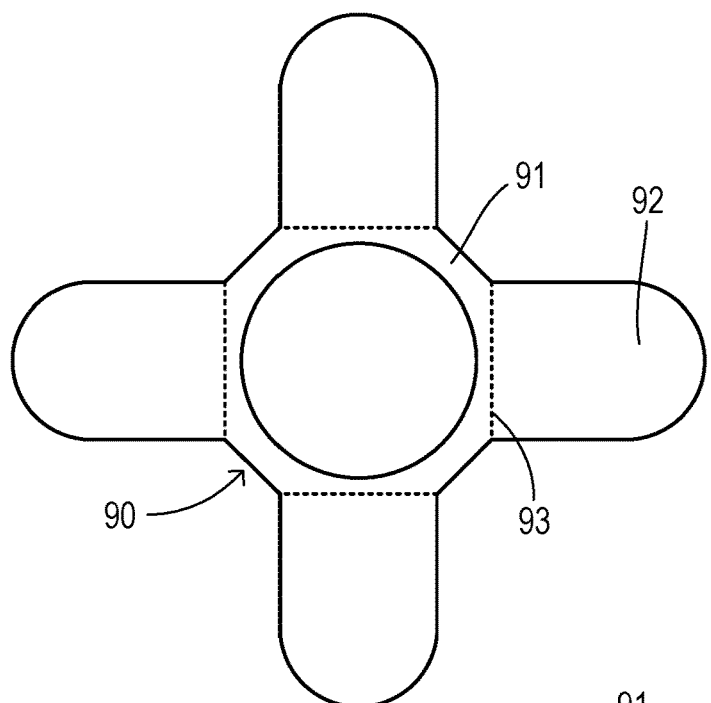
FIG. 17A is a top, plan view of another embodiment of a base sheet of the invention.
Figure 17B:
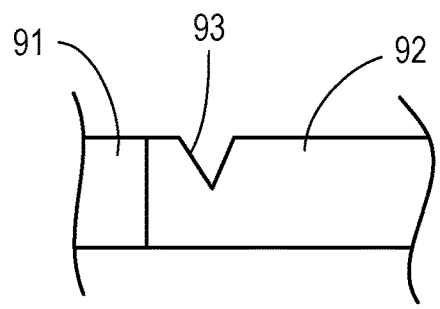
FIG. 17B is a partial side view of the base sheer of FIG. 17A.

FIGS. 17A and 17B show another embodiment of a base sheet 90 with a plurality of footpads extending from an inner ring 91, including a footpad 92. To reduce resistance to folding of footpad 92, a living hinge 93 is formed along the interface of footpad 92 with inner ring 91. Living hinge 93 is comprised of a continuous groove where the thickness of base sheet 90 is reduced.

Figure 18:
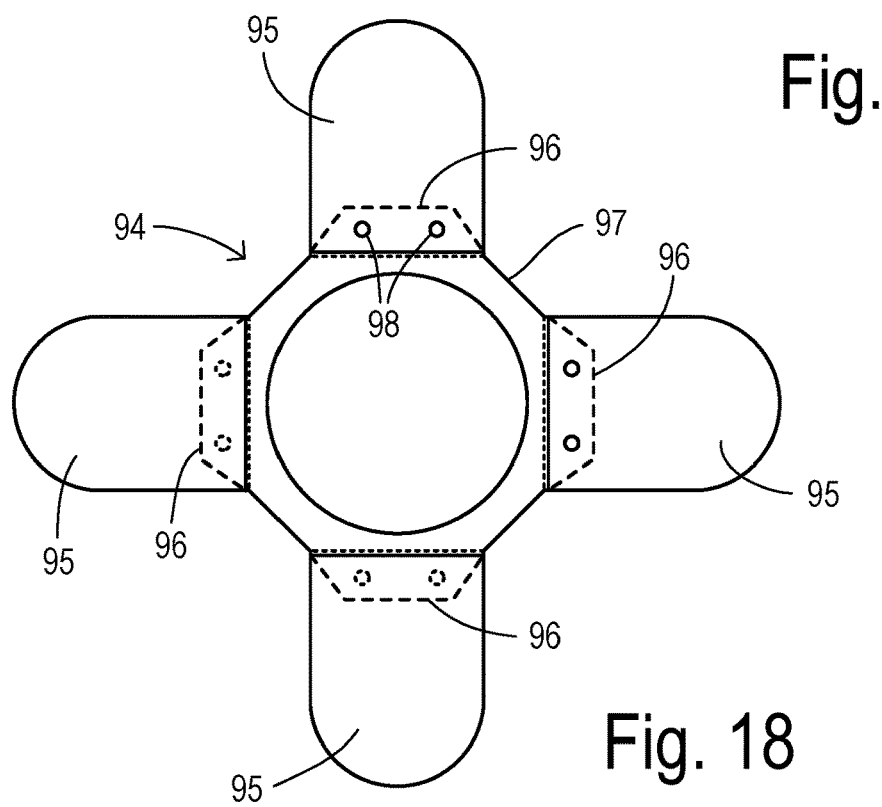
FIG. 18 is a top, plan view of another embodiment of a base sheet of the invention.

FIG. 18 shows another embodiment of a base sheet 94 wherein a plurality of footpads 95 can be made of a different material than an inner ring 97. Thus, footpads 95 are overmolded onto respective radial extensions 96 of inner ring 97, allowing inner ring 97 to be relatively less flexible and footpads 95 to be relatively more flexible in order to obtain both good stability of the mounting device and reliable attachment to irregular surfaces of the reservoir. An adhesive coating (not shown) can be applied to both footpads 95 and inner ring 97 or only to footpads 95. A plurality of through-holes 98 are provided in extensions 96 to improve retention of overmolded footpads 95.

Figure 19:
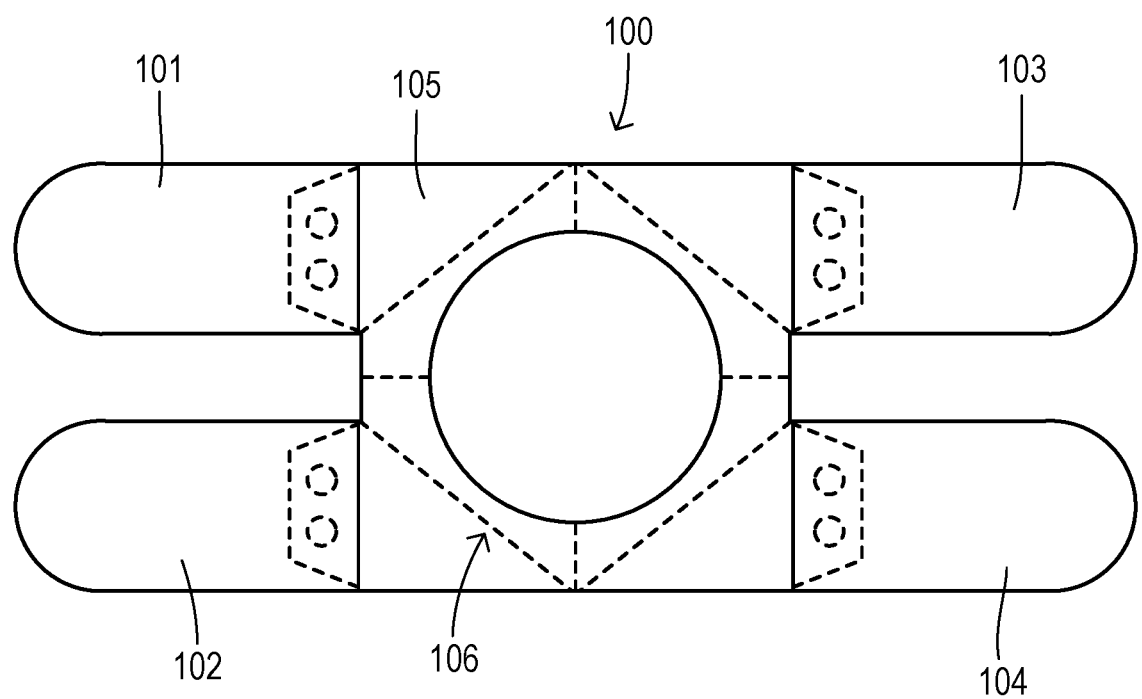
FIG. 19 is a top, plan view of another embodiment of a base sheet of the invention.

Different orientations and/or number of footpads can be used. FIG. 19 shows a base sheet 100 with two parallel sets of footpads 101/102 and 103/104. Overmolded footpads on respective extensions of an inner ring 105 are shown, but a continuous material for base sheet 100 can also be used. Various lines of perforations or living hinges 106 are formed in inner ring 105 to facilitate tearing or folding along various lines which may be useful in fitting to different regions of the reservoir walls that may be encountered.

What is claimed is:

1. A mounting device for attaching a blood sensor to a wall of a blood reservoir, comprising:
   a base sheet with a central aperture and a plurality of radial footpads extending from an inner ring encompassing the central aperture, wherein the footpads are flexible, and wherein an adhesive covers at least a portion of a bottom surface of the footpads for adhering the base sheet to the reservoir wall;
   a rigid receiver having a tubular shape with a central bore and configured to secure the blood sensor to interface with the reservoir wall within the central aperture; and
   a coupling member having a tubular shape with an upper ring secured to the receiver, a bottom end secured to the inner ring of the base sheet, and a resilient linking section between the upper ring and the bottom end, wherein the coupling member suspends the rigid receiver such that the central bore is aligned with the central aperture, and wherein the resilient linking section flexes to orient the blood sensor to be orthogonal with the reservoir wall.

2. The mounting device of claim 1 wherein the resilient linking section is comprised of a plurality of flexible tethers.

3. The mounting device of claim 2 wherein the flexible tethers are comprised of helical arms following helical paths between the bottom end and the upper ring.

4. The mounting device of claim 2 wherein the bottom end is comprised of a base ring.

5. The mounting device of claim 4 wherein the base sheet is overmolded onto the base ring.

6. The mounting device of claim 4 wherein the base ring, flexible tethers, and upper ring are comprised of a unitary molding.

7. The mounting device of claim 1 wherein the coupling member is comprised of a cylindrical collar.

8. The mounting device of claim 7 wherein the bottom end of the cylindrical collar is attached to a top surface of the inner ring.

9. The mounting device of claim 1 wherein the central bore of the receiver has a slotted surface making a bayonet connection with the blood sensor.

10. The mounting device of claim 1 wherein the base sheet is comprised of an optically transparent material.

11. The mounting device of claim 1 wherein the base sheet includes a line of perforations traversing a footpad for tearing off at least a portion of the footpad along the line of perforations.

12. The mounting device of claim 1 wherein the base sheet includes a living hinge comprised of a straight segment along the base sheet having a reduced thickness to reduce resistance to folding along the living hinge.

* * * * *